United States Patent
Sakae

(10) Patent No.: US 9,136,617 B2
(45) Date of Patent: Sep. 15, 2015

(54) BATTERY CONNECTOR FORMED OF PLURAL MATERIALS, AND PRODUCTION METHOD

(75) Inventor: Akira Sakae, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 262 days.

(21) Appl. No.: 13/810,939

(22) PCT Filed: Oct. 13, 2011

(86) PCT No.: PCT/JP2011/073587
§ 371 (c)(1),
(2), (4) Date: Jan. 18, 2013

(87) PCT Pub. No.: WO2012/050173
PCT Pub. Date: Apr. 19, 2012

(65) Prior Publication Data
US 2013/0130572 A1    May 23, 2013

(30) Foreign Application Priority Data
Oct. 15, 2010 (JP) .................................. 2010-232448

(51) Int. Cl.
*H01R 24/00* (2011.01)
*H01R 11/01* (2006.01)
(Continued)

(52) U.S. Cl.
CPC .............. *H01R 11/01* (2013.01); *B21C 23/007* (2013.01); *B23K 20/02* (2013.01); *H01M 2/1077* (2013.01);
(Continued)

(58) Field of Classification Search
CPC .............................. H01M 2/202; H01M 2/204
USPC .................................... 439/627; 429/158, 160
See application file for complete search history.

(56) References Cited

U.S. PATENT DOCUMENTS 6,156,452 A    12/2000  Kozuki et al.
6,844,110 B2*  1/2005  Enomoto et al. .............. 429/170
(Continued)

FOREIGN PATENT DOCUMENTS

EP    0 964 461 A1    12/1999
EP    1 160 893 A2    12/2001
(Continued)

OTHER PUBLICATIONS

The Extended European Search Report issued Dec. 13, 2013, in Application No. / Patent No. 11832604.0-1359 / 2581966 PCT/JP2011073587.

(Continued)

*Primary Examiner* — Neil Abrams
(74) *Attorney, Agent, or Firm* — Oblon, McClelland, Maier & Neustadt, L.L.P.

(57) ABSTRACT

An electrically conductive connecting member which can be used for a battery having a positive output terminal and a negative output terminal composed of different metals from each other and which does not undergo electrolytic corrosion and reduction in electric resistance and has excellent mechanical strength. This electrically conductive connecting member is used for a battery in which a pair of output terminals are composed of different metals from each other, and includes an electrode section (a bar-shaped section) connected to one of the output terminals and composed of the same metal as that used for one of the output terminals and a bus bar section (a band-plate-shaped section) connected to the electrode section and composed of the same metal as that used for the other output terminal, wherein the electrode section and the bus bar section are integrated with each other through diffusion bonding.

7 Claims, 13 Drawing Sheets

(51) Int. Cl.
*H01M 2/20* (2006.01)
*H01M 2/30* (2006.01)
*H01M 2/10* (2006.01)
*H01R 11/28* (2006.01)
*H01R 43/00* (2006.01)
*B21C 23/00* (2006.01)
*B23K 20/02* (2006.01)
*H01M 10/0525* (2010.01)

(52) U.S. Cl.
CPC .............. *H01M 2/206* (2013.01); *H01M 2/305* (2013.01); *H01R 11/288* (2013.01); *H01R 43/00* (2013.01); *B23K 2201/38* (2013.01); *H01M 10/0525* (2013.01); *Y02T 10/7011* (2013.01); *Y10T 29/49204* (2015.01)

(56) References Cited

U.S. PATENT DOCUMENTS

| | | | | |
|---|---|---|---|---|
| 7,776,467 | B2* | 8/2010 | Kato et al. | 429/160 |
| 8,460,818 | B2* | 6/2013 | Kim et al. | 429/158 |
| 8,574,008 | B2* | 11/2013 | Große et al. | 439/627 |
| 8,603,664 | B2* | 12/2013 | Ishizu et al. | 429/158 |
| 8,777,668 | B2* | 7/2014 | Ikeda et al. | 439/627 |
| 8,785,029 | B2* | 7/2014 | Oda et al. | 429/121 |
| 8,801,444 | B2* | 8/2014 | Sakae et al. | 439/212 |
| 2001/0049054 | A1 | 12/2001 | Enomoto et al. | |
| 2005/0100785 | A1 | 5/2005 | Enomoto et al. | |
| 2011/0064993 | A1* | 3/2011 | Ochi | 429/158 |
| 2011/0081568 | A1* | 4/2011 | Kim et al. | 429/158 |
| 2011/0117420 | A1* | 5/2011 | Kim et al. | 429/158 |
| 2011/0206943 | A1* | 8/2011 | Willis et al. | 428/609 |
| 2011/0293995 | A1* | 12/2011 | Sasaki et al. | 429/158 |
| 2012/0315807 | A1 | 12/2012 | Sakae | |
| 2013/0012079 | A1* | 1/2013 | Sakae et al. | 439/884 |

FOREIGN PATENT DOCUMENTS

| | | |
|---|---|---|
| EP | 1 160 893 A3 | 12/2001 |
| EP | 2 393 144 A1 | 12/2011 |
| GB | 2 299 701 A | 10/1996 |
| JP | 2000-77052 A | 3/2000 |
| JP | 2002 151045 | 5/2002 |
| JP | 2002 358945 | 12/2002 |
| JP | 2002-373638 A | 12/2002 |
| JP | 2003-123733 A | 4/2003 |
| JP | 2003-163039 A | 6/2003 |
| JP | 2007 134233 | 5/2007 |
| JP | 2010-103053 A | 5/2010 |
| JP | 2011 124024 | 6/2011 |
| JP | 2011 138765 | 7/2011 |
| WO | 2010 087472 | 8/2010 |
| WO | WO 2011/122453 A1 | 10/2011 |

OTHER PUBLICATIONS

T. Z. Blazynski, "Extrusion", Section 4.7, Manufacturing Engineer's reference Book, Nov. 1, 1993, XP055090629, pp. 4/73-4/96.

J. F. Lancaster, "Solid-phase welding", Section 2, "Metallurgy of welding", 6th Ed., Abington Publishing, XP055090436, May 28, 1999, pp. 40-53.

International Search Report Issued Jan. 24, 2012 in PCT/JP11/73587 Filed Oct. 13, 2011.

* cited by examiner

FIG. 15
(a) 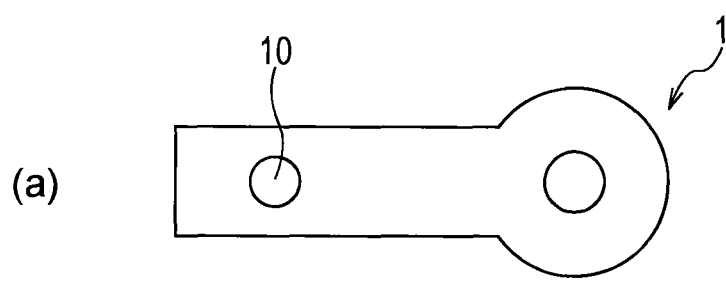
(b) 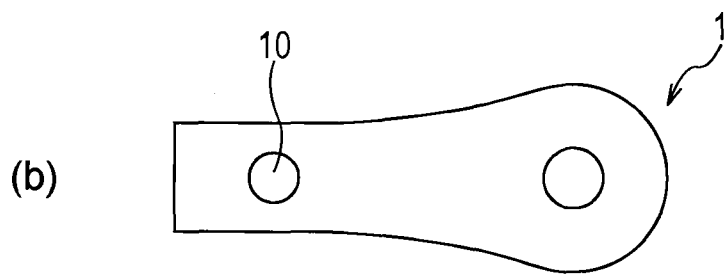
(c) 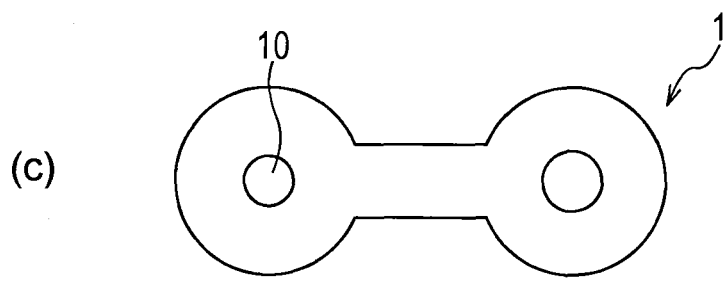

BATTERY CONNECTOR FORMED OF PLURAL MATERIALS, AND PRODUCTION METHOD

TECHNICAL FIELD

The present invention relates to an electrically conductive connecting member that is suitable for use in a battery including a plus output terminal and a minus output terminal composed of different metals, a production method for the electrically conductive connecting member, and a battery equipped with the electrically conductive connecting member as an electrode.

BACKGROUND ART

As a battery to be mounted in an electric car, a hybrid car, etc., there is known an assembled battery obtained by connecting a plurality of battery cells such that positive and negative electrodes thereof are connected in series (for example, see PTL 1). Such an assembled battery is characterized in having high output and high energy density. In most cases, lithium ion batteries are used as the battery cells. In a lithium ion battery, a plus output terminal is formed of aluminum (Al), and a minus output terminal is formed of copper (Cu).

A bus bar (a component used to distribute electric energy) is a component that connects terminals of such battery cells. As a production method for such a bus bar, for example, members that constitute the bus bar are subjected to laser beam welding, as disclosed in PTL 2.

CITATION LIST

Patent Literature

PTL 1: Japanese Unexamined Patent Application Publication No. 2002-373638
PTL 2: Japanese Unexamined Patent Application Publication No. 2003-163039

SUMMARY OF INVENTION

Technical Problem

When battery cells are connected in series, as described above, a plus output terminal (aluminum) and a minus output terminal (copper) are connected by a bus bar. For this reason, the bus bar and one of the terminals are necessarily connected by connection of different kinds of metals whichever the bus bar is formed of aluminum or copper.

In general, it is well known that, when different kinds of metals are connected, electrolytic corrosion (electrochemical corrosion) occurs via moisture in the air. Therefore, as this electrolytic corrosion proceeds, electrical continuity between the bus bar and the terminal is broken or the bus bar or the terminal itself is damaged. Finally, this leads to a serious problem in that the electric car cannot be started.

As a solution to this problem, PTL 2 proposes that a bus bar is produced by bonding an aluminum piece and a copper piece through laser beam welding or other methods. However, in a bus bar experimentally produced in this method, an eutectic was produced in a laser-welded portion between two kinds of metals, and this excessively increased the electric resistance and seriously decreased the mechanical strength (in particular, brittleness and tensile strength). Hence, the bus bar was not practically usable.

To fundamentally solve the above problem, it is essential not only to improve the bus bar, but also to improve and develop other members, for example, an electrode terminal provided in a battery cell.

The present invention has been made in view of the above circumstances, and provides an electrically conductive connecting member that has both a structure and operation of an electrode terminal and a structure and operation of a bus bar and that is suitable for use in a battery including a plus output terminal and a minus output terminal composed of different metals. Further, an object of the invention is to provide a high-performance and high-reliability electrically conductive connecting member that reduces electric resistance while preventing electrolytic corrosion and that is excellent in mechanical strength, and a production method for the electrically conductive connecting member.

Solution to Problem

To achieve the above object, the present invention takes the following measures.

That is, an electrically conductive connecting member according to the present invention is an electrically conductive connecting member for power output that is used for a battery including a pair of output terminals formed of different metals, and includes an electrode section connected to one of the output terminals and formed of the same metal as that for the one of the output terminals, and a bus bar section connected to the electrode section and formed of the same metal as that for the other output terminal. The electrode section and the bus bar section are integrated with each other through diffusion bonding.

Here, the term "output terminal" refers to a positive-electrode carrier or a negative-electrode carrier included in a battery cell or the like or a portion having continuity to the carrier.

Further, the term "diffusion bonding" refers to a state in which different metals to be bonded form a bonding interface where the metals are in tight contact with each other on the metal tissue level, and as a result, electrical conductivity and mechanical bonding strength of a bonded body are lower on the single metal side than at the interface.

Preferably, the electrode section is a columnar bar-shaped section, and the bus bar section is a band-plate-shaped section connected to one end of the bar-shaped section and extending in a direction away from an axial center of the bar-shaped section.

Through the use of this electrically conductive connecting member, the plus output terminal and the minus output terminal of the battery cell are formed of the same metal in appearance, electrolytic corrosion in the terminal connecting portion and the increase in electric resistance due to electrolytic corrosion are reduced, and this not only enhances reliability of the assembled battery, but also enhances reliability of a connecting portion (bus bar section) between battery cells. In addition, since the electrode section (bar-shaped section) and the bus bar section (band-plate-shaped section) of the electrically conductive connecting member are integrated through diffusion bonding, electrolytic corrosion and the increase in electric resistance due to electrolytic corrosion do not occur in the bonded portion.

An embedded material formed of the same metal as that for the bar-shaped section may be embedded in a center portion of the band-plate-shaped section in a plate thickness direction where the bar-shaped section is to be connected.

Preferably, when the electrically conductive connecting member is adopted for a plus output terminal of a lithium ion battery, the bar-shaped section is formed of aluminum or an aluminum alloy and the band-plate-shaped section is formed of copper or a copper alloy.

Preferably, when the electrically conductive connecting member is adopted for a minus output terminal of a lithium ion battery, the bar-shaped section is formed of copper or a copper alloy and the band-plate-shaped section is formed of aluminum or an aluminum alloy.

To produce the above-described electrically conductive connecting member (in which the band-plate-shaped section extends from one end of the bar-shaped section in the direction away from the axial center of the bar-shaped section and the embedded material is not embedded in the band-plate-shaped section), a production method can be adopted which includes preparing a composite blank including a metal blank that forms the bar-shaped section and a metal blank that surrounds the metal blank for the bar-shaped section and forms the band-plate-shaped section, and cutting the band-plate-shaped section to form the bar-shaped section after subjecting the composite blank to extrusion or drawing with a die in a hydrostatic pressure environment.

By adopting this production method, an electrically conductive connecting member can be produced in which a metal material that forms a bar-shaped section and a metal material that forms a band-plate-shaped section are integrated through diffusion bonding and electrolytic corrosion does not occur.

To produce the above-described electrically conductive connecting member (in which the embedded material is embedded in the center portion of the band-plate-shaped section in the plate thickness direction), a production method can be adopted which includes preparing a composite blank including a metal blank that forms the bar-shaped section and a metal blank that surrounds the metal blank for the bar-shaped section and forms the band-plate-shaped section, cutting the band-plate-shaped section to expose a part of the embedded material outside after the composite blank is subjected to extrusion or drawing with a die in a hydrostatic pressure environment, and welding the bar-shaped section to the exposed part of the embedded material.

By adopting this production method, an electrically conductive connecting member can be produced in which a metal material that forms a bar-shaped section and a metal material that forms a band-plate-shaped section are integrated through diffusion bonding and electrolytic corrosion does not occur.

Besides the above-described production methods, a production method can also be adopted which includes forming an attachment hole in a metal blank that forms the band-plate-shaped section, and press-fitting a metal blank that forms the bar-shaped section in the attachment hole so that the metal blank is held protruding from the metal blank that forms the band-plate-shaped section.

Here, the term "press-fitting" is to plastically deform a metal blank that forms the band-plate-shaped section and the metal blank that forms the bar-shaped section in a radial direction and a press-fitting direction between an inner peripheral surface of the attachment hole and an outer peripheral surface of the bar-shaped section while the opening area of the attachment hole is set to be smaller than the cross-sectional area of the metal blank that forms the bar-shaped section and, as a result, to form "a diffusion-bonded portion" by a bonding interface between the inner peripheral surface of the attachment hole and the outer peripheral surface of the bar-shaped section.

A battery according to the present invention includes, as one or the other of electrodes, the above-described electrically conductive connecting member or an electrically conductive connecting member produced by the above-described production method.

Advantageous Effects of Invention

According to the present invention, it is possible to realize a high-performance and high-reliability electrically conductive connecting member that is suitable for a battery including a plus output terminal and a minus output terminal formed of different metals, that can suppress electric resistance while preventing electrolytic corrosion, and that is excellent in mechanical strength.

While this electrically conductive connecting member can be used alone for various batteries, it is possible to produce a battery in which the electrically conductive connecting member of the present invention is assembled as one electrode beforehand and to offer the battery including the electrically conductive connecting member to a market.

BRIEF DESCRIPTION OF DRAWINGS

FIG. 12(C) is a perspective view illustrating a completed state.

FIG. 13(C) is a perspective view illustrating a completed state.

FIGS. 15(a) to 15(c) are plan views illustrating modifications of an electrically conductive connecting member.

DESCRIPTION OF EMBODIMENTS

Embodiments of the present invention will be described below with reference to the drawings.

First Embodiment

FIGS. 1 to 6 illustrate an electrically conductive connecting member 1 according to a first embodiment of the present invention.

Figure 1:
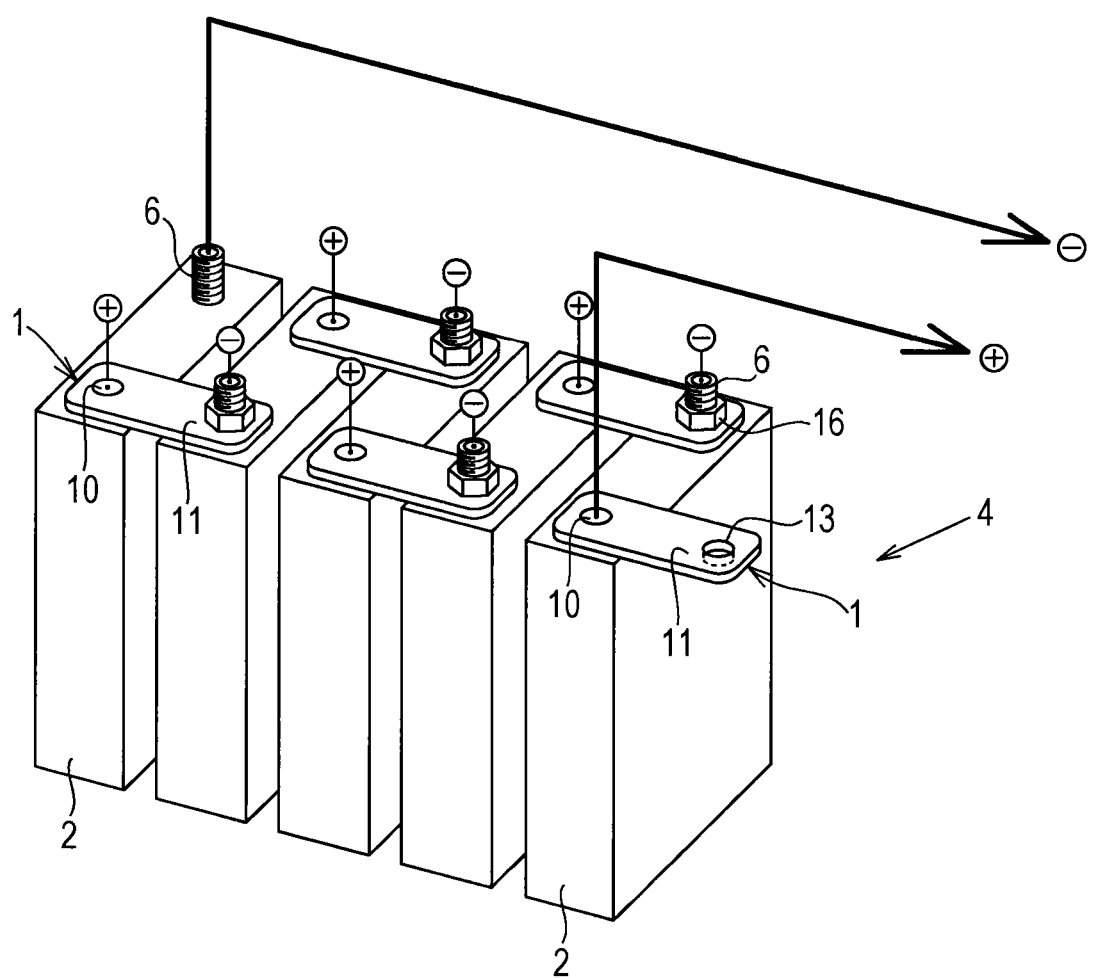
FIG. 1 is a perspective view of an assembled battery formed using electrically conductive connecting members according to a first embodiment.
Figure 2:
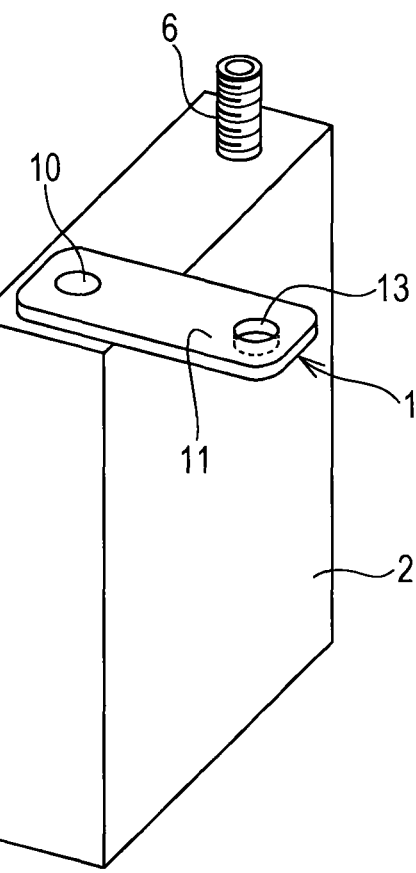
FIG. 2 is a perspective view of a battery cell using an electrically conductive connecting member of the first embodiment.
Figure 3:
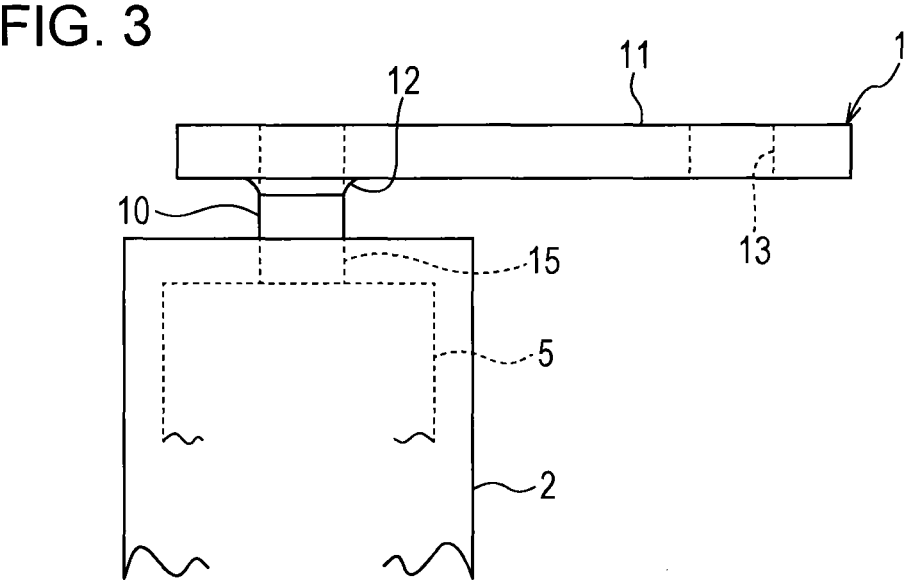
FIG. 3 is a side view of the battery cell using the electrically conductive connecting member of the first embodiment.
Figure 4:
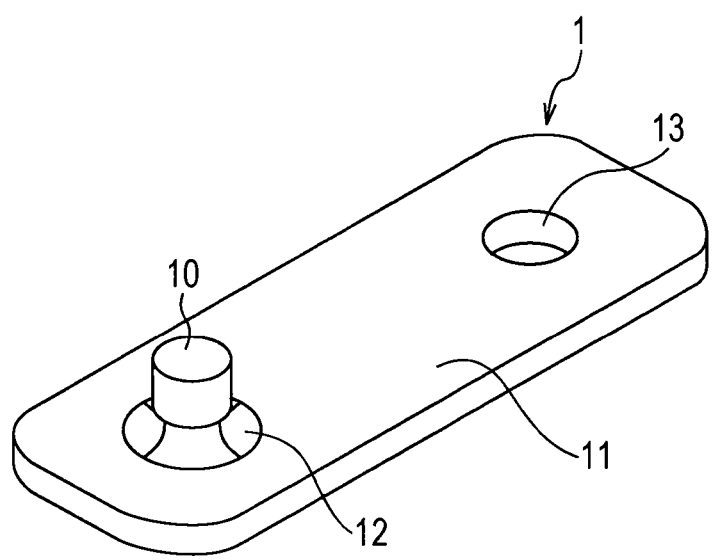
FIG. 4 is a perspective view of the electrically conductive connecting member of the first embodiment.
Figure 5:
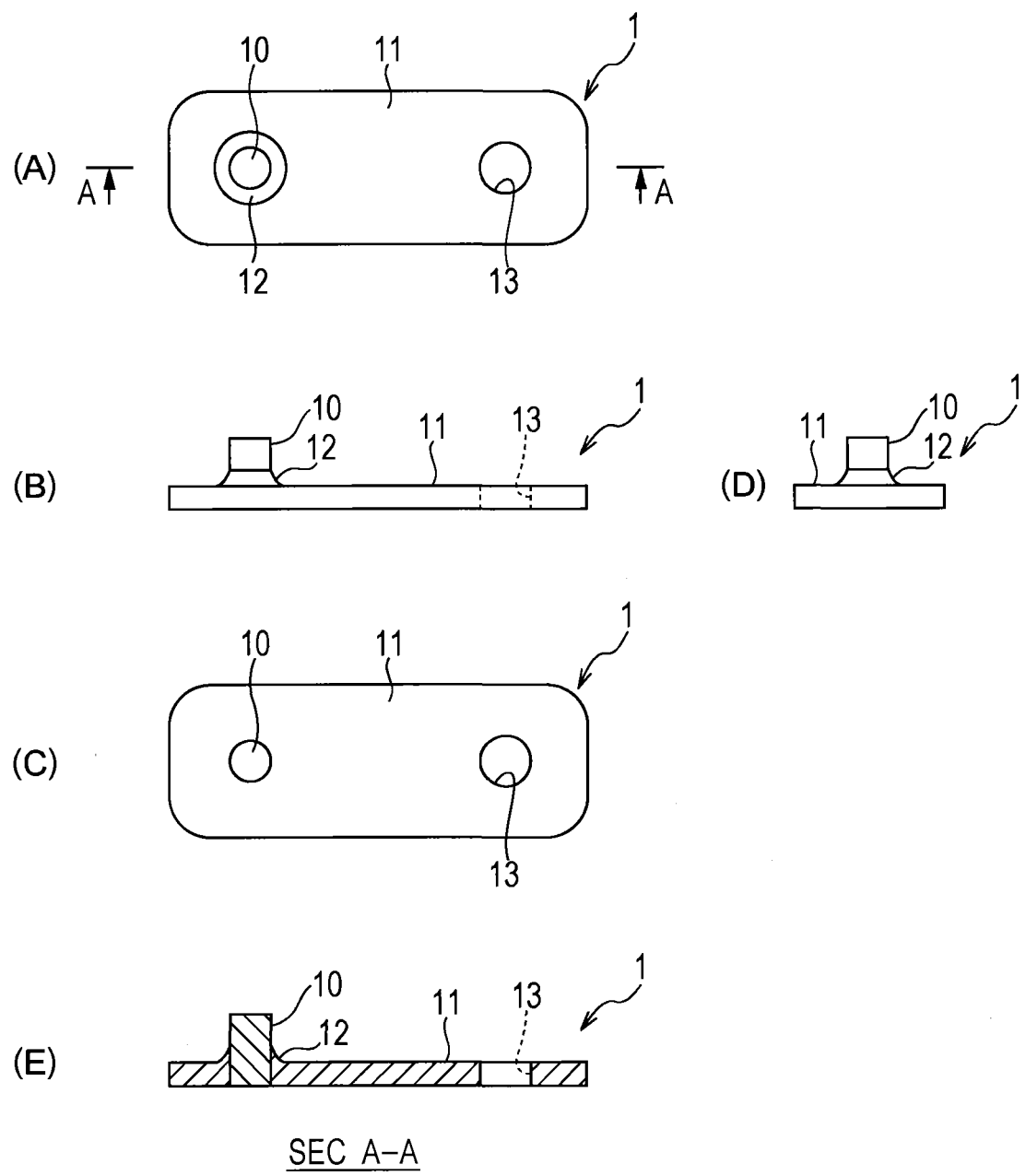
FIGS. 5(A), 5(B), 5(C), 5(D), and 5(E) are a plan view, a front view, a bottom view, a right side view, and a cross-sectional view, taken along line A-A of FIG. 5(A), respectively, illustrating the electrically conductive connecting member of the first embodiment.

As illustrated in FIGS. 1 to 3, the electrically conductive connecting member 1 is incorporated as one electrode of a battery 2. By this electrode (electrically conductive connecting member 1), a plurality of battery cells 2 can be connected in series to form an assembled battery 4. That is, each battery cell 2 is connected via an electrically conductive connecting member 1 serving as an electrode of a plus output terminal (plus output side) thereof to a minus output terminal (minus output side) of another battery cell 2.

Each battery cell 2 is a lithium-ion battery, and a plus output terminal (plus output side) thereof is formed of aluminum or an aluminum alloy. This is because, as illustrated in FIG. 3, a positive-electrode carrier 5 provided in the battery cell 2 (a base body for fixing electrons and ions) is formed of aluminum or an aluminum alloy and the plus output terminal provided integrally with or separately from the positive-electrode carrier 5 with continuity is formed of aluminum or an aluminum alloy. In contrast, a minus output terminal of the battery cell 2 is formed of copper or a copper alloy. At the minus output terminal, a minus terminal 6 protrudes upward from an upper end of the battery cell 2. An outer peripheral surface of the minus terminal 6 is threaded externally.

As illustrated in FIGS. 1 to 5, the electrically conductive connecting member 1 (electrode) of the present invention includes a columnar bar-shaped section 10 (electrode section), and a band-plate-shaped section 11 (bus bar section) that is connected to one end of the bar-shaped section 10 and extends in a direction away from an axial center of the bar-shaped section 10.

An axial direction of the bar-shaped section 10 and a plate-surface extending direction of the band-plate-shaped section 11 are orthogonal to each other. A connecting portion between the bar-shaped section 10 and the band-plate-shaped section 11 has a structure such that the band-plate-shaped section 11 is fitted on the one end of the bar-shaped section 10 (the one end of the bar-shaped section 10 penetrates through the band-plate-shaped section 11). In the illustrated example, an end of the bar-shaped section 10 connected to the band-plate-shaped section 11 and penetrating through the band-plate-shaped section 11 is flush with a surface of the band-plate-shaped section 11. However, alternatively, the bar-shaped section 10 penetrating through the band-plate-shaped section 11 may further slightly protrude from the band-plate-shaped section 11.

The bar-shaped section 10 is shaped like a round bar, and the band-plate-shaped section 11 is shaped like a rectangular plate round-chamfered at four corners in plan view. The thickness of the bar-shaped section 10 is substantially constant, and the thickness of the band-plate-shaped section 11 is substantially constant.

The band-plate-shaped section 11 has a raised portion 12 that surrounds the root of the bar-shaped section 10. The raised portion 12 is raised by the influence of the edge shape of a cutting tool during a procedure for producing the electrically conductive connecting member 1 (cutting step), and has a round concave face provided all around its circumference. An end of the band-plate-shaped section 11 opposite a side of the bar-shaped section 10 has a connecting hole 13 provided through the band-plate-shaped section 11 in a plate thickness direction.

The raised portion 12 is not always necessary as a structure of the electrically conductive connecting member 1. However, the raised portion 12 is effective in reinforcing a protruding state of the bar-shaped section 10 from the band-plate-shaped section 11 and in being used as an index of the amount by which the band-plate-shaped section 11 floats from the battery cell 2 (ensuring a floating state) when the electrically conductive connecting member 1 is attached to the battery cell 2.

In the first embodiment, the outer diameter of the bar-shaped section 10 is set at 5 to 25 mm, and the protruding length of the bar-shaped section 10 from the band-plate-shaped section 11 is set at 10 to 100 mm. The inner diameter of the connecting hole 13 provided in the band-plate-shaped section 11 is set to be suitable to receive the minus terminal 6 provided on the battery cell 2 (nominal diameter is about 4 to 12 mm). While the dimensions of the band-plate-shaped section 11 can be appropriately changed according to the connection distance between battery cells 2 and the amount of current, for example, for example, the long side length is 30 to 70 mm, the short side length is 20 to 60 mm, and the thickness is 1 to 2 mm.

The bar-shaped section 10 and the band-plate-shaped section 11 are formed of different kinds of metals. As described above, when the electrically conductive connecting member 1 of the present invention is adopted for the plus output terminal of the battery cell 2, the bar-shaped section 10 is formed of the same metal as that for the positive-electrode carrier 5 and the plus output terminal of the battery cell 2, that is, formed of aluminum or an aluminum alloy. The band-plate-shaped section 11 is formed of the same metal as that for a negative-electrode carrier, the minus output terminal, and the minus terminal 6 of the battery cell 2, that is, formed of copper or a copper alloy.

An outer peripheral surface of a portion of the bar-shaped section 10 extending through the band-plate-shaped section 11 and an inner peripheral surface of a portion of the band-plate-shaped section 11 fitted on the bar-shaped section 10 (that is, a contact portion between the bar-shaped section 10 and the band-plate-shaped section 11) are subjected to diffusion bonding. Here, the term diffusion bonding refers to a state in which the metal (Al) of the bar-shaped section 10 and the metal (Cu) of the band-plate-shaped section 11 are deformed under ultrahigh pressure (e.g., about 1000 MPa) to form a binding interface where the metals are in tight contact with each other on the metal tissue level, and as a result, electrical conductivity and mechanical binding structure are increased to "values practically suitable for the electrically conductive connecting member 1."

As illustrated in FIG. 3, when the electrically conductive connecting member 1 having such a structure is attached to the battery cell 2, the portion of the bar-shaped section 10 protruding from the band-plate-shaped section 11 is used as an internal connecting portion 15. That is, the internal connecting portion 15 is electrically connected to the plus output terminal of the battery cell 2 (a portion provided integrally with or separately from the positive-electrode carrier 5). Further, the connecting hole 13 provided in the band-plate-shaped section 11 is fitted on a minus terminal 6 of a battery cell 2 to be connected, and a copper nut 16 (see FIG. 1) formed of the same metal as that for the band-plate-shaped section 11 is screwed on the protruding minus terminal 6 (externally threaded portion).

Instead of screwing the nut 16 for bonding, the minus terminal 6 may be inserted in the connecting hole 13 of the band-plate-shaped section 11 and the minus terminal 6 and the connecting hole 13 may then be welded together. In this case, since the portions of the same metal are welded, no electrical and mechanical problems occur.

In this case, the bar-shaped section 10 (internal connecting portion 15) of the electrically conductive connecting member 1 and the plus output terminal (portion formed integrally with or separately from the positive-electrode carrier 5) of the battery cell 2 are connected by connection of the same metal, and therefore, electrolytic corrosion does not occur. Further, the band-plate-shaped section 11 (the inner surface of the connecting hole 13 serving as an external connecting portion) of the electrically conductive connecting member 1, and the outer surface of the minus terminal 6 of the battery cell 2 and the nut 16 are also connected by connection of the same metal. Hence, electrolytic corrosion does not occur.

In addition, while the bar-shaped section 10 and the band-plate-shaped section 11 of the electrically conductive connecting member 1 are formed of different metals, they are diffusion-bonded, and therefore, electrolytic corrosion does not occur. Also, the bar-shaped section 10 and the band-plate-shaped section 11 are kept in a state in which the electric resistance is suppressed.

As results of these, in the assembled battery 4 formed by connecting a plurality of battery cells 2 in series by the electrically conductive connecting member 1 of the present invention, electrolytic corrosion does not occur in any connecting portion, and high-efficiency conductivity is ensured. Further, since the electrically conductive connecting member 1 has excellent mechanical strength, it does not bend or break in a normal use condition.

In the first embodiment, the bar-shaped section 10 is lightweight because it is formed of aluminum or an aluminum alloy, and this can reduce the weight of the assembled battery 4. For this reason, the first embodiment is useful in weight reduction of an electric car in which the assembled battery 4 is mounted as a battery.

Figure 6:
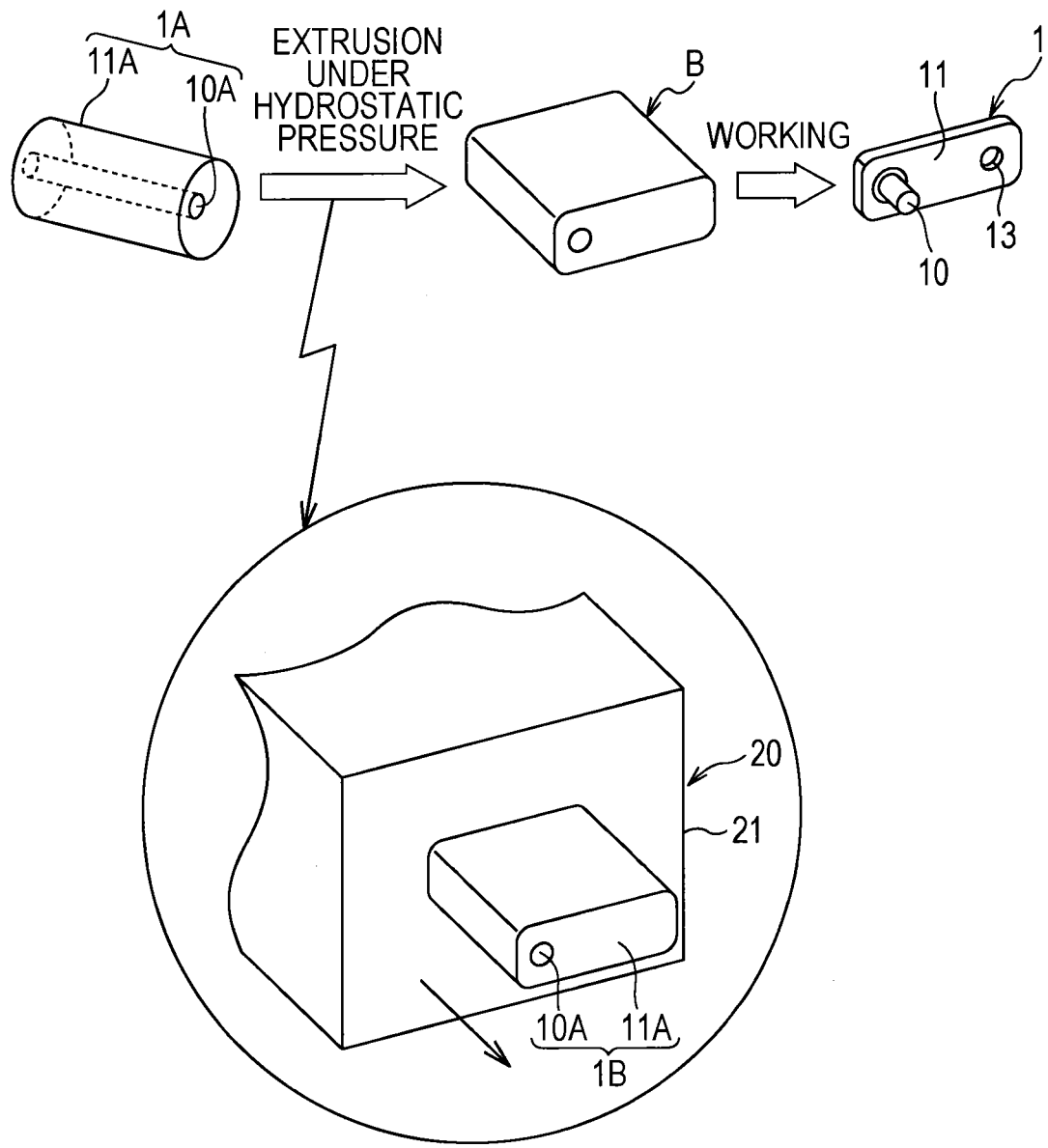
FIG. 6 is a perspective view illustrating a procedure for producing the electrically conductive connecting member of the first embodiment.

To produce the electrically conductive connecting member 1 having such a structure, extrusion is performed under high or ultrahigh hydrostatic pressure, as illustrated in FIG. 6.

An extrusion device 20 used for extrusion includes a single-opening die 21 (dice) corresponding to a planar shape of a band-plate-shaped section 11 to be obtained (see FIG. 5(A)), and can perform extrusion in an isotropic pressure environment under ultrahigh pressure (up to about 1000 MPa).

In a production procedure for the electrically conductive connecting member 1, first, a positive-electrode blank 10A (metal blank) formed of the same metal (aluminum or an aluminum alloy) as that for a positive-electrode carrier 5 and a plus output terminal of a battery cell 2 is prepared in a bar form. Also, a negative-electrode blank 11A (metal blank) formed of the same metal (copper or a copper alloy) as that for a negative-electrode carrier, a minus output terminal, and a minus terminal 6 of the battery cell 2 is prepared in a band form.

A billet (composite blank) 1A entirely shaped like a thick round bar is prepared by winding the negative-electrode blank 11A around the bar-shaped positive-electrode blank 10A. At this time, the bar-shaped positive-electrode blank 10A is set to be shifted from the center portion of the thick round bar of the billet 1A. The negative-electrode blank 11A may be shaped like a hollow pipe in which the bar-shaped positive-electrode blank 10A can be eccentrically inserted, and the positive-electrode blank 10A may be inserted in the negative-electrode blank 11A to form the billet 1A.

Next, the billet 1A is loaded in the extrusion device 20, and the extrusion device 20 is started in an isotropic pressure environment under ultrahigh pressure (up to 1000 MPa). Since the billet 1A is structured by winding the negative-electrode blank 11A around the positive-electrode blank 10A, as described above, the positive-electrode blank 10A and the negative-electrode blank 11A are pushed out in parallel (subjected to extrusion or drawing), and a molded part 1B is obtained in which the positive-electrode blank 10A and the negative-electrode blank 11A are integrated by diffusion bonding.

Since the opening area of the die 21 of the extrusion device 20 is smaller than the cross-sectional area of the billet 1A, when the billet 1A is passed through the die 21, it is compressed all around its circumference to plastically deform. After coming out of the die 21, a joint surface between the positive-electrode blank 10A and the negative-electrode blank 11A forms "an interface (diffusion-bonded portion) between an outer peripheral surface of a bar-shaped section 10 and an inner peripheral surface of a band-plate-shaped section 11."

The molded part 1B thus obtained is cut at a predetermined interval in an extruding direction. Since the die 21 of the extrusion device 20 has the opening shaped correspondingly to the planar shape of the band-plate-shaped section 11 (see FIG. 5(A)) in the first embodiment, the cutting interval of the molded part 1B is set in accordance with the length of the bar-shaped section 10, which corresponds to the height of the electrically conductive connecting member 1.

After being cut, the negative-electrode blank 11A is subjected to cutting (milling) to a thickness of a band-plate-shaped section 11. Thereby, a band-plate-shaped section 11 is formed, and the positive-electrode blank 10A remains in a protruding state to form a bar-shaped section 10 and a raised portion 12 provided around the root of the bar-shaped section 10. Further, the portion having the thickness of the band-plate-shaped section 11 is subjected to boring to form a connecting hole 13, whereby an electrically conductive connecting member 1 is completed. Surface polishing or surface treatment may be performed as needed.

The electrically conductive connecting member 1 thus produced is formed by integrating the bar-shaped section 10 formed of the same metal as that for the positive-electrode carrier 5 of the battery cell 2 and the band-plate-shaped section 11 formed of the same metal as that for the minus terminal 6 of the battery cell 2 through diffusion bonding. Hence, electrolytic corrosion does not occur and electric resistance is reduced in any portion of the electrically conductive connecting member 1. Moreover, the mechanical strength is excellent.

Figure 7:
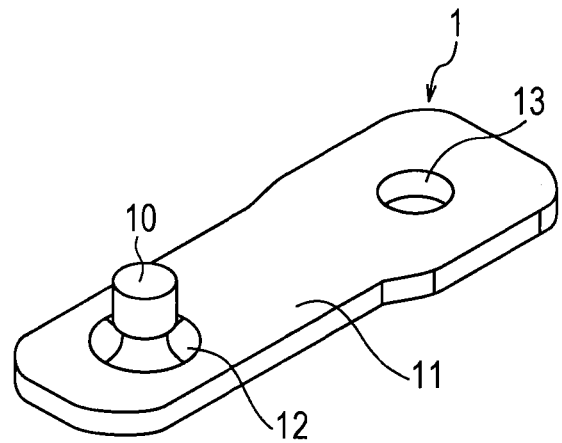
FIG. 7 is a perspective view of a modification of the electrically conductive connecting member of the first embodiment.

In the first embodiment, the shapes and outer dimensions of the bar-shaped section 10 and the band-plate-shaped section 11 are not limited. For example, as illustrated in FIG. 7, the connecting strength of the band-plate-shaped section 11 may be increased by enlarging a portion around the connecting hole 13 in a plate surface direction. Further, the four corners of the band-plate-shaped section 11 may be subjected to angular chamfering instead of round chamfering, or chamfering may be omitted (angular corners may be formed). Alternatively, the band-plate-shaped section 11 may be entirely shaped like a long circle in plan view. The bar-shaped section 10 can be shaped like a square bar.

Second Embodiment

Figure 8:
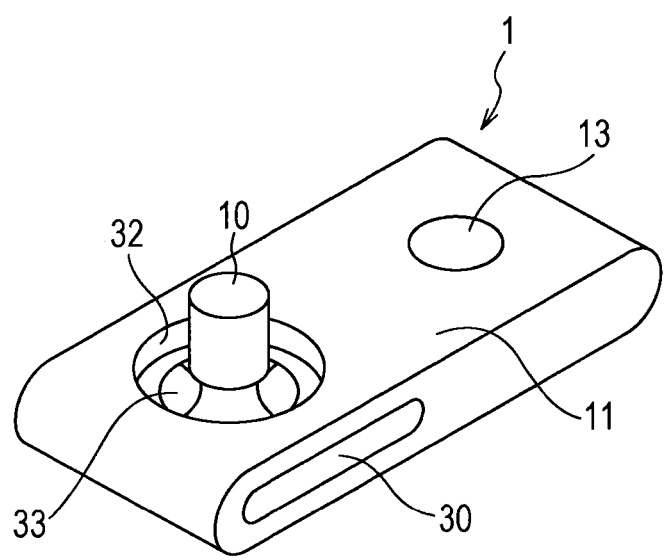
FIG. 8 is a perspective view of an electrically conductive connecting member according to a second embodiment.
Figure 9:
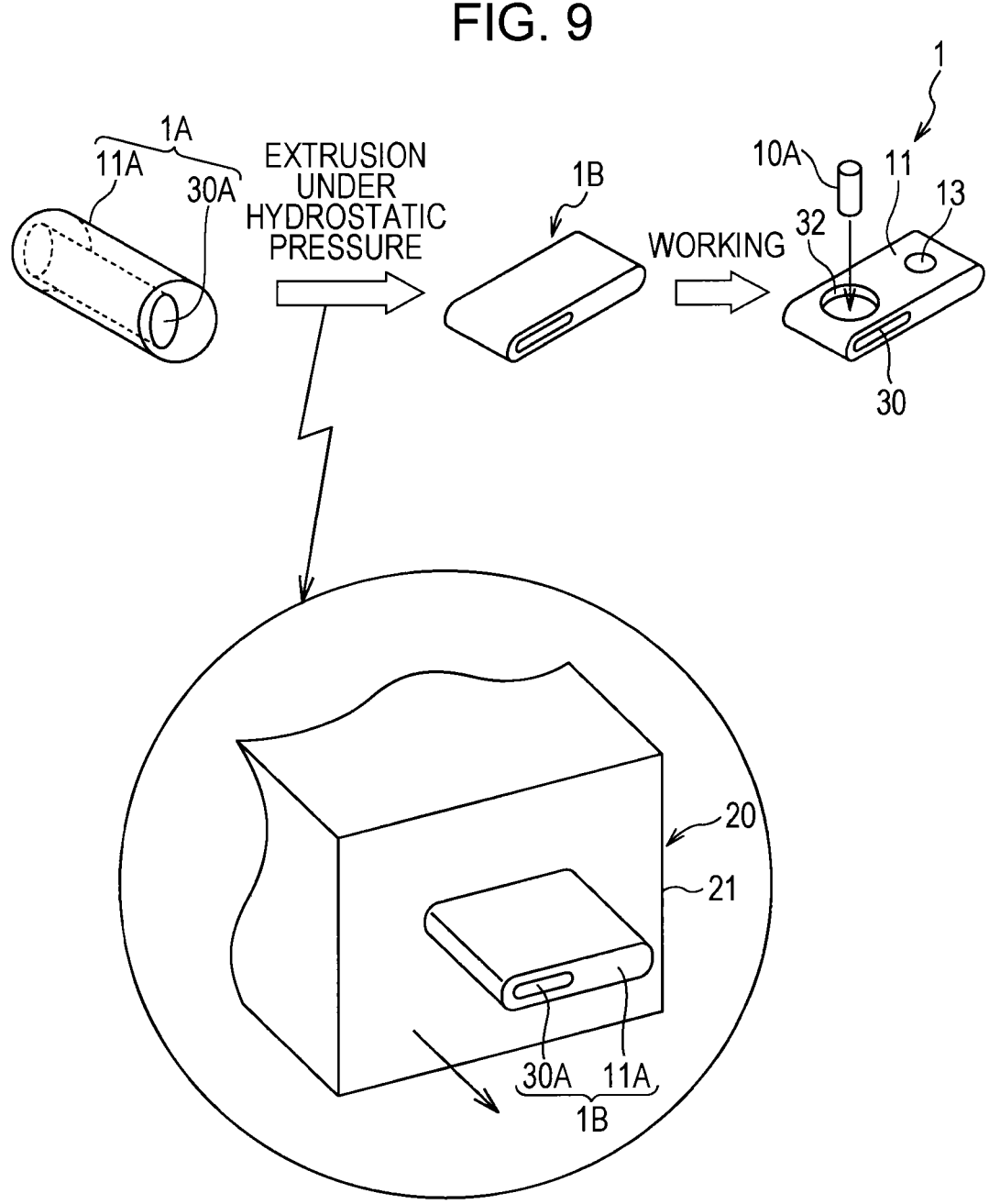
FIG. 9 is a perspective view illustrating a procedure for producing the electrically conductive connecting member of the second embodiment.

FIGS. 8 and 9 illustrate an electrically conductive connecting member 1 according to a second embodiment of the present invention. As illustrated in FIG. 8, in the electrically conductive connecting member 1 of the second embodiment, an embedded material 30 is embedded in a center portion of a band-plate-shaped section 11 in a plate thickness direction.

The electrically conductive connecting member 1 of the second embodiment is also adopted for a plus output terminal of a battery cell 2 (see FIGS. 1 and 2). For this reason, a bar-shaped section 10 is formed of the same metal (aluminum or an aluminum alloy) as that for a positive-electrode carrier 5 and the plus output terminal of the battery cell 2, and the band-plate-shaped section 11 is formed of the same metal (copper or a copper alloy) as that for a positive-electrode carrier and a plus output terminal of the battery cell 2. This point is identical to that of the second embodiment. A connecting hole 13, which penetrates through the band-plate-shaped section 11 in the plate thickness direction, is provided in an end portion of the band-plate-shaped section 11 opposite a side where the bar-shaped section 10 is provided. This point is also identical to that of the second embodiment.

The embedded material 30 is arranged at a position that is aligned with a portion of the band-plate-shaped section 11 to which the bar-shaped section 10 is connected (a position where the bar-shaped section 10 and the embedded material 30 overlap with each other in plan view). This embedded material 30 is provided not to reach the position of the connecting hole 13. However, specific dimensions of the embedded material 30 (e.g., shape and size in plan view, and thickness) are not limited particularly.

The embedded material 30 is formed of the same metal as that for the bar-shaped section 10. That is, the embedded material 30 is formed of the same metal as that for the positive-electrode carrier 5 and the plus output terminal of the battery cell 2, more specifically, aluminum or an aluminum alloy.

The band-plate-shaped section 11 has a recess 32 that surrounds the bar-shaped section 10 in the portion to which the bar-shaped section 10 is connected. An upper face of the embedded material 30 is exposed in a bottom portion of the recess 32. The recess 32 may be formed by slightly digging the upper face of the embedded material 30. In any case, the bottom portion of the recess 32 is formed by the embedded material 30. The aperture size of the recess 32 is preferably set to fit in the size of the embedded material 30 in plan view.

The bottom portion of the recess 32, that is, the upper face of the embedded material 30 exposed in the recess 32 is provided with a raised portion 33 that surrounds the root of the bar-shaped section 10. The raised portion 33 is a filling portion (e.g., beads, a base material, or a welding material) to be produced in a welding process when the bar-shaped section 10 is connected to the embedded material 30 by welding. When a fitting hole or a fitting recess for the bar-shaped section 10 is formed in the embedded material 30 before welding, positioning and holding can be easily and reliably performed during welding.

The raised portion 33 is effective in reinforcing a state in which the bar-shaped section 10 protrudes from the band-plate-shaped section 11 (embedded material 30). The raised portion 33 is received in the recess 32, but does not protrude from the surface of the band-plate-shaped section 11. In other words, it is useful to form the recess 32 when the bar-shaped section 10 is connected to the band-plate-shaped section 11 (embedded material 30), because the raised portion 33 does not protrudes outside.

An outer peripheral surface of the embedded material 30 and an inner peripheral surface of the band-plate-shaped section 11 are diffusion-bonded by die working under ultrahigh isotropic pressure. While the bar-shaped section 10 and the embedded material 30 are connected by welding, as described above, since the embedded material 30 and the bar-shaped section 10 are both formed of aluminum or an aluminum alloy, that is, formed of the same metal, an eutectic is not produced in a welded portion therebetween. Thus, electrolytic corrosion does not occur and the electric resistance is kept suppressed. Moreover, the mechanical strength is sufficient, and there is no problem.

As a result, electrolytic corrosion does not occur between the bar-shaped section 10 and the band-plate-shaped section 11, and the electric resistance is kept suppressed. This point is identical to that of the second embodiment.

To produce the electrically conductive connecting member 1 of the second embodiment, extrusion is performed under ultrahigh hydrostatic pressure similarly to the first embodiment, as illustrated in FIG. 9.

Unlike the first embodiment, however, an extrusion device 20 used for extrusion includes a single-opening die 21 corresponding to a front shape of a band-plate-shaped section 11 to be obtained (see FIG. 5(B) illustrating the first embodiment). Similarly to the first embodiment, the extrusion device 20 can perform extrusion in an isotropic pressure environment under ultrahigh pressure (up to about 1000 MPa).

In a production procedure for the electrically conductive connecting member 1, first, a positive-electrode blank 30A (metal blank) formed of the same metal as that for a bar-shaped section 10 is prepared, for example, in the form of a bar of elliptic cross section. Since the bar-shaped section 10 is formed of the same metal (aluminum or an aluminum alloy) as that for a positive-electrode carrier 5 and a plus output terminal of a battery cell 2, the positive-electrode blank 30A is also ultimately formed of the same metal as that for the positive-electrode carrier 5 and the plus output terminal of the battery cell 2.

Also, a negative-electrode blank 11A (metal blank) formed of the same metal (copper or a copper alloy) as that for a negative-electrode carrier, a minus output terminal, and a minus terminal 6 of the battery cell 2 is prepared in a band form.

Then, a billet (composite blank) 1A entirely shaped like a thick round bar is prepared by winding the negative-electrode blank 11A around the bar-shaped positive-electrode blank 30A. At this time, the bar-shaped positive-electrode blank 30A is set to be shifted from the center portion of the thick round bar of the billet 1A.

Next, the billet 1A is loaded in the extrusion device 20, and the extrusion device 20 is started in an isotropic pressure environment under ultrahigh pressure (up to 1000 MPa). Since the billet 1A is structured by winding the negative-electrode blank 11A around the positive-electrode blank 30A, as described above, the positive-electrode blank 30A and the negative-electrode blank 11A are pushed out in parallel (subjected to extrusion or drawing), and a molded part 1B is obtained in which the positive-electrode blank 30A and the negative-electrode blank 11A are integrated through diffusion bonding.

Further, since the opening area of the die 21 of the extrusion device 20 is smaller than the cross-sectional area of the billet 1A, when the billet 1A is passed through the die 21, it is compressed all around its circumference to plastically deform. After coming out of the die 21, a joint surface between the blanks 30A and 11A forms "an interface (diffusion-bonded portion) between an outer peripheral surface of an embedded material 30 and an inner peripheral surface of a band-plate-shaped section 11."

The molded part 1B thus obtained is cut at a predetermined interval in an extruding direction. The cutting interval of the molded part 1B corresponds to a size of a short side (width) of a rectangle of the band-plate-shaped section 11 in plan view.

After being cut, a portion of the bar-shaped negative-electrode blank 11A near one longitudinal end is subjected to cutting (milling) to form a recess 32 (a recess of a depth that allows an upper surface of an embedded material 30 to be exposed), and a portion near the other longitudinal end is subjected to boring to form a connecting hole 13, whereby a band-plate-shaped section 11 is formed.

Further, a positive-electrode blank 10A shaped like a round bar and formed of the same metal (aluminum or an aluminum alloy) blank (metal blank) as that for the positive-electrode carrier 5 and the plus output terminal of the battery cell 2 is prepared, and the positive-electrode blank 10A (that is, a member to be a bar-shaped section 10) is connected to the embedded material 30 exposed in the recess 32 of the band-plate-shaped section 11 by welding. In this way, an electrically conductive connecting member 1 is completed. Surface polishing or surface treatment may be performed as needed.

In the electrically conductive connecting member 1 of the second embodiment, the bar-shaped section 10 and the band-plate-shaped section 11 are diffusion-bonded with the embedded material 30 electrically combined with the bar-shaped section 10 being disposed therebetween. That is, in the electrically conductive connecting member 1 of the second embodiment, the bonding area (contact area) of the diffusion-bonded portion is increased by the presence of the embedded material 30, compared with the electrically conductive connecting member 1 of the first embodiment in which the bar-shaped section 10 and the band-plate-shaped section 11 are directly diffusion-bonded.

For this reason, the electrically conductive connecting member 1 of the second embodiment is more suitable for conduction of large current than the electrically conductive connecting member 1 of the first embodiment.

In the electrically conductive connecting member 1 of the second embodiment, other structures, operating effects, and usage are substantially identical to those adopted in the first embodiment, and detailed descriptions thereof are skipped here.

Third Embodiment

Figure 10:
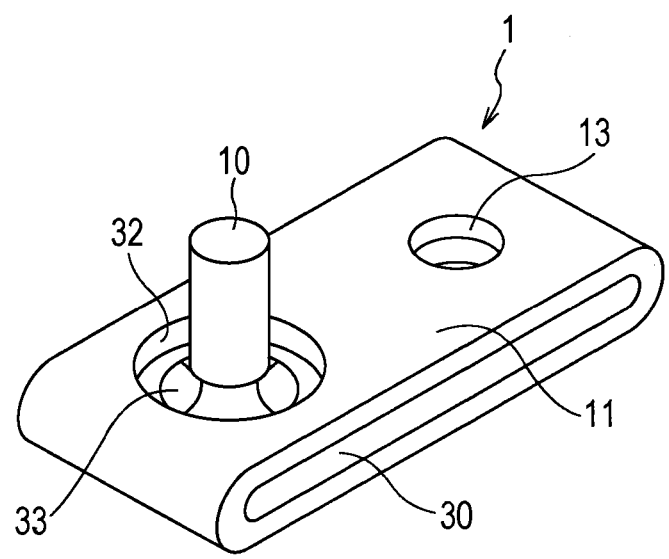
FIG. 10 is a perspective view of an electrically conductive connecting member according to a third embodiment.
Figure 11:
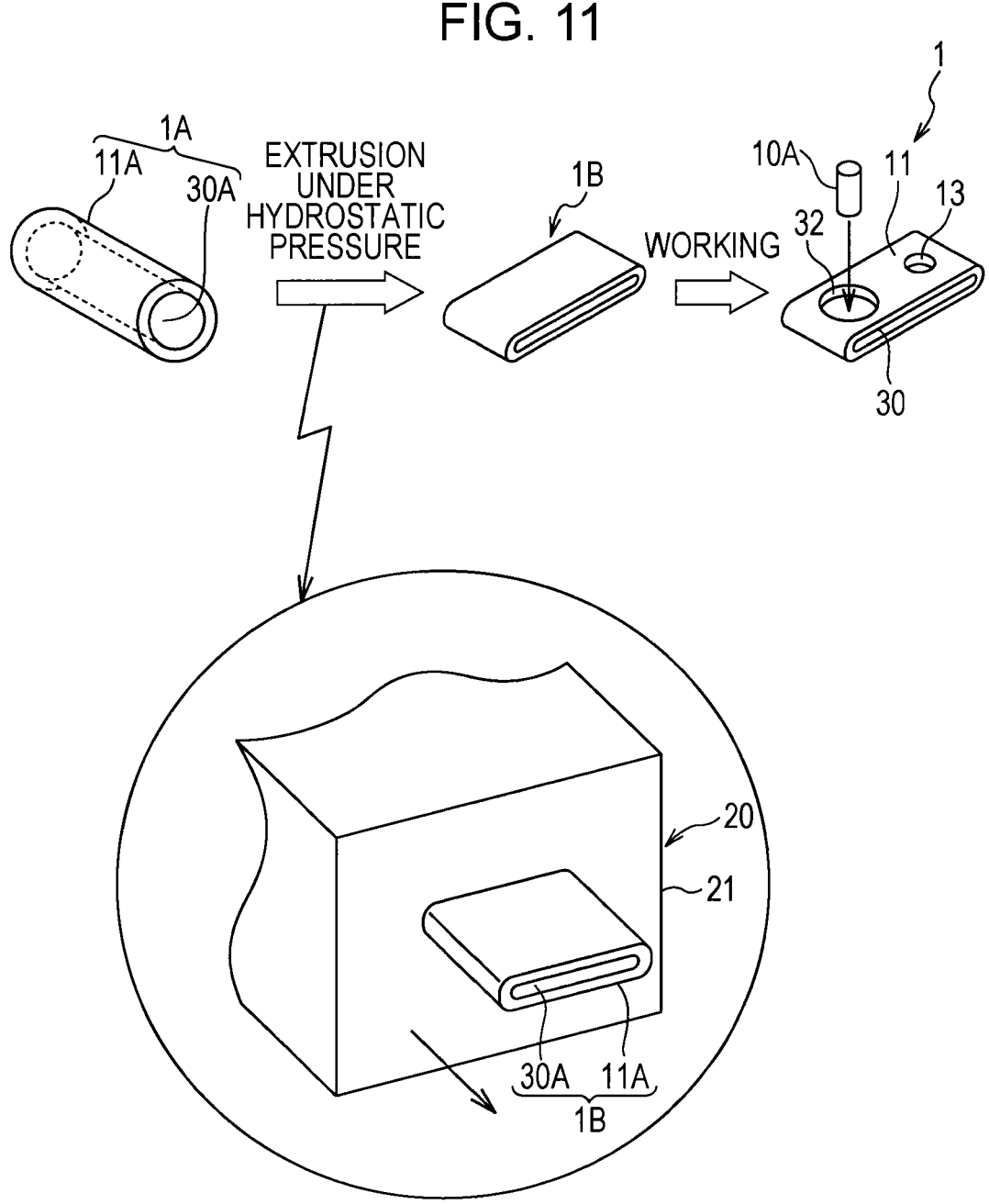
FIG. 11 is a perspective view illustrating a procedure for producing the electrically conductive connecting member of the third embodiment.

FIGS. 10 and 11 illustrate an electrically conductive connecting member 1 according to a third embodiment of the present invention.

The electrically conductive connecting member 1 of the third embodiment is substantially similar to the second embodiment (see FIG. 8), and an embedded material 30 is embedded in a center portion in a plate thickness direction of a band-plate-shaped section 11, as illustrated in FIG. 10.

The greatest difference of the electrically conductive connecting member 1 of the third embodiment from the second embodiment is that the embedded material 30 is embedded in the overall longitudinal direction of the entire band-plate-shaped section 11. That is, the embedded material 30 reaches both a portion where a bar-shaped section 10 is connected to the band-plate-shaped section 11 and a position where a connecting hole 13 is formed.

The third embodiment is identical to the second embodiment in that the embedded material 30 is formed of the same metal (aluminum or an aluminum alloy) as that for the bar-shaped section 10 and in that a recess 32 is provided in the band-plate-shaped section 11 and the bar-shaped section 10 is connected to the embedded material 30 that forms a bottom of the recess 32 by welding.

Further, as illustrated in FIG. 10, the electrically conductive connecting member 1 of the third embodiment is produced in a manner similar to that adopted in the second embodiment except that a positive-electrode blank 30A (metal blank) for forming the embedded material 30 is prepared in a round bar form and a negative-electrode blank 11A is wound around the positive-electrode blank 30A to form a billet (composite blank) 1A that is shaped like a thick round bar entirely formed by two concentric circles.

In the electrically conductive connecting member 1 of the third embodiment, since the size of the embedded material 30 is larger than in the electrically conductive connecting member 1 of the second embodiment, the bonding area (contact area) of a diffusion-bonded portion is increased. Hence, the electrically conductive connecting member 1 of the third embodiment is more suitable for conduction of large current.

The embedded material 30 is exposed in an inner peripheral surface of the connecting hole 13 provided in the band-plate-shaped section 11. When a minus terminal 6 of a battery cell 2 is inserted in the connecting hole 13, it is brought into contact with the embedded material 30. However, the minus terminal 6 inserted in the connecting hole 13 is also reliably in contact with the band-plate-shaped section 11 that clamps the embedded material 30 from both front and back sides. For this reason, continuity is ensured between the band-plate-shaped section 11 and the minus terminal 6 that are formed of the same metal and have low electric resistance, and there is no problem.

Other structures, operating effects, and usage of the electrically conductive connecting member 1 of the third embodiment are substantially identical to those adopted in the second embodiment, and detailed descriptions thereof are skipped here.

Fourth Embodiment

Figure 12:
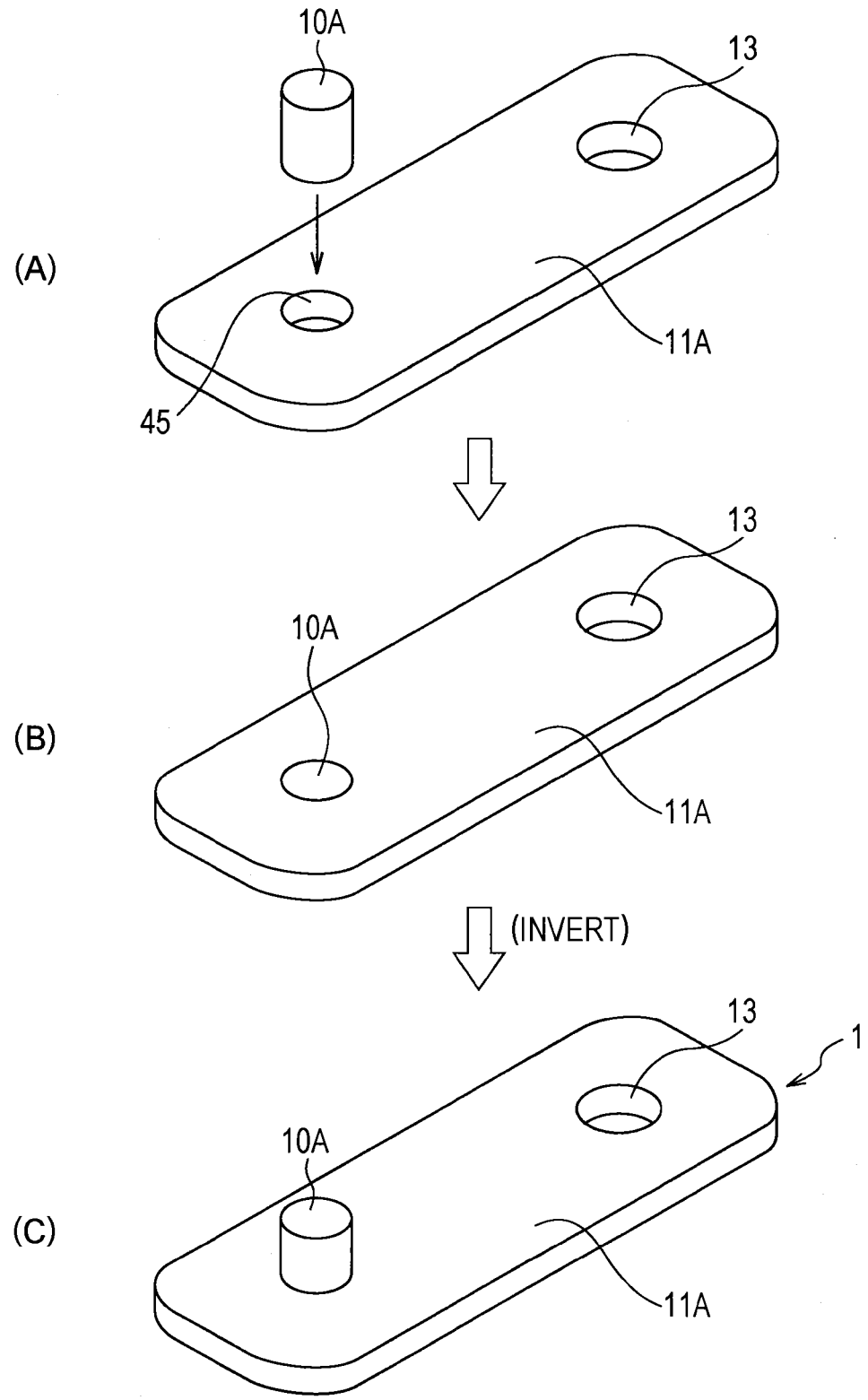
FIGS. 12(A) to 12(C) are perspective views illustrating in order steps of producing an electrically conductive connecting member according to a fourth embodiment.

FIGS. 12(A) to 12(C) illustrate an electrically conductive connecting member 1 according to a fourth embodiment of the present invention.

The electrically conductive connecting member 1 of the fourth embodiment is substantially identical to the electrically conductive connecting member 1 of the first embodiment (see FIG. 4) in appearance (a band-plate-shaped section 11 is shaped like a completely flat plate, but does not have a raised portion 12 that surrounds the root of a bar-shaped section 10).

The electrically conductive connecting member 1 of the fourth embodiment is characterized in a production method therefor.

That is, to produce the electrically conductive connecting member 1, first, a negative-electrode blank 11A (metal blank) to form a band-plate-shaped section 11 and a positive-electrode blank 10A (metal blank) to form a bar-shaped section 10 are prepared, as illustrated in FIG. 12(A).

The negative-electrode blank 11A is formed of the same metal (copper or a copper alloy) as that for a negative-electrode carrier, a minus output terminal, and a minus terminal 6 of a battery cell 2 (see FIG. 1), and is shaped in an outer form as the band-plate-shaped section 11 (a rectangular plate having round-chamfered four corners).

An attachment hole 45 to which the positive-electrode blank 10A is to be connected is provided in a portion near one longitudinal end of the negative-electrode blank 11A, and a connecting hole 13 is provided in a portion near the other longitudinal end. The opening area of the attachment hole 45 is smaller than the cross-sectional area of the bar-shaped section 10 (positive-electrode blank 10A).

The positive-electrode blank 10A is formed of the same metal (aluminum or an aluminum alloy) as that for a positive-electrode carrier 5 and a plus output terminal of the battery cell 2 (see FIG. 1), and is shaped in an outer form (round bar form) as the bar-shaped section 10.

Then, as illustrated in FIG. 12(B), the positive-electrode blank 10A is press-fitted in the attachment hole 45 of the negative-electrode blank 11A. Press-fitting is performed so that the positive-electrode blank 10A is held protruding from the negative-electrode blank 11A. Preferably, the positive-electrode blank 10A is press-fitted from one side of the attachment hole 45 to protrude to the other side of the attachment hole 45 (so that the positive-electrode blank 10A temporarily passes through the attachment hole 45 in almost the entire length).

In this way, as illustrated in FIG. 12(C), the positive-electrode blank 10A held protruding from the attachment hole 45 forms a bar-shaped section 10, and an electrically conductive connecting member 1 can be completed. Surface polishing or surface treatment may be performed as needed.

By the above-described press-fitting, the negative-electrode blank 11A and the positive-electrode blank 10A are plastically deformed in the radial direction and in the press-fitting direction between an inner peripheral surface of the attachment hole 45 and an outer peripheral surface of the bar-shaped section 10. As a result, an interface between the inner peripheral surface of the attachment hole 45 and the outer peripheral surface of the bar-shaped section 10 forms "a diffusion-bonded portion."

In the electrically conductive connecting member 1 thus produced, the bar-shaped section 10 formed of the same metal as that for the positive-electrode carrier 5 of the battery cell 2 and the band-plate-shaped section 11 formed of the same metal as that for the minus terminal 6 of the battery cell 2 are integrated through diffusion bonding. Hence, electrolytic corrosion does not occur and electric resistance can be reduced in any portion of the electrically conductive connecting member 1. Moreover, mechanical strength is high.

Other structures, operating effects, and usage of the electrically conductive connecting member 1 of the fourth embodiment are substantially identical to those adopted in the first embodiment, and detailed descriptions thereof are skipped here.

Fifth Embodiment

FIGS. 13(A) to 13(C) illustrate an electrically conductive connecting member 1 according to a fifth embodiment of the present invention.

The electrically conductive connecting member 1 of the fifth embodiment is substantially identical to the electrically conductive connecting member 1 of the second embodiment (see FIG. 8) in appearance, and an embedded material 30 is embedded in a center portion of a band-plate-shaped section 11 in a plate thickness direction to be aligned with a portion to which a bar-shaped section 10 is to be connected. The embedded material 30 is provided not to reach a position where a connecting hole 13 is to be formed (the band-plate-shaped section 11 does not have a recess 32 that surrounds the root of the bar-shaped section 10).

When the electrically conductive connecting member 1 of the fifth embodiment is produced, similarly to the production method for the electrically conductive connecting member 1 of the second embodiment (see FIG. 9), a billet (composite blank) 1A shaped like a thick round bar in which a positive-electrode blank 30A is eccentrically provided is obtained by winding a negative-electrode blank 11A around the positive-electrode blank 30A, the billet 1A is subjected to extrusion or drawing with an extrusion device 20 capable of extrusion under a ultrahigh hydrostatic pressure, and a molded part 1B is formed in which the positive-electrode blank 30A and the negative-electrode blank 11A are integrated through diffusion bonding.

The molded part 1B thus obtained is cut to a dimension of a short side of a rectangle of the band-plate-shaped section 11 in plan view.

After cutting, an attachment hole 45 to which the positive-electrode blank 10A is to be connected is formed in a portion of the band-plate-shaped negative-electrode blank 11A near one longitudinal end, and a connecting hole 13 is formed in a portion near the other longitudinal end. The opening area of the attachment hole 45 is set to be smaller than the cross-sectional area of a bar-shaped section 10 (positive-electrode blank 10A).

After that, substantially similarly to the production method for the electrically conductive connecting member 1 of the fourth embodiment (see FIGS. 12(B) and 12(C)), the positive-electrode blank 10A is press-fitted in the attachment hole 45 of the negative-electrode blank 11A so as to be held protruding from the negative-electrode blank 11A, as illustrated in FIG. 13(B).

In this way, as illustrated in FIG. 13(C), a bar-shaped section 10 is formed by the positive-electrode blank 10A held protruding from the attachment hole 45, and an electrically conductive connecting member 1 can be completed. Surface polishing or surface treatment may be performed as needed.

As a result of the above-described press fitting, a bonding interface between an inner peripheral surface of the attachment hole 45 and an outer peripheral surface of the bar-shaped section 10 forms "a diffusion-bonded portion", similarly to the fourth embodiment.

Other structures, operating effects, and usage of the electrically conductive connecting member 1 of the fifth embodiment are substantially identical to those adopted in the second embodiment, and detailed descriptions thereof are skipped here.

Figure 14:
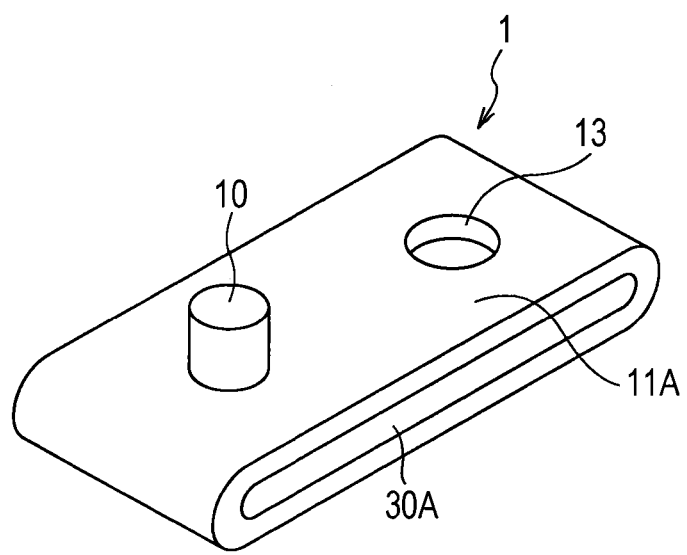
FIG. 14 is a perspective view of a modification of the electrically conductive connecting member of the fifth embodiment.

According to this production method, as illustrated in FIG. 14, an electrically conductive connecting member 1 in which an embedded material 30 is embedded in almost the entire band-plate-shaped section 11 can also be produced, similarly to the electrically conductive connecting member 1 of the third embodiment (see FIG. 10).

Figure 13:
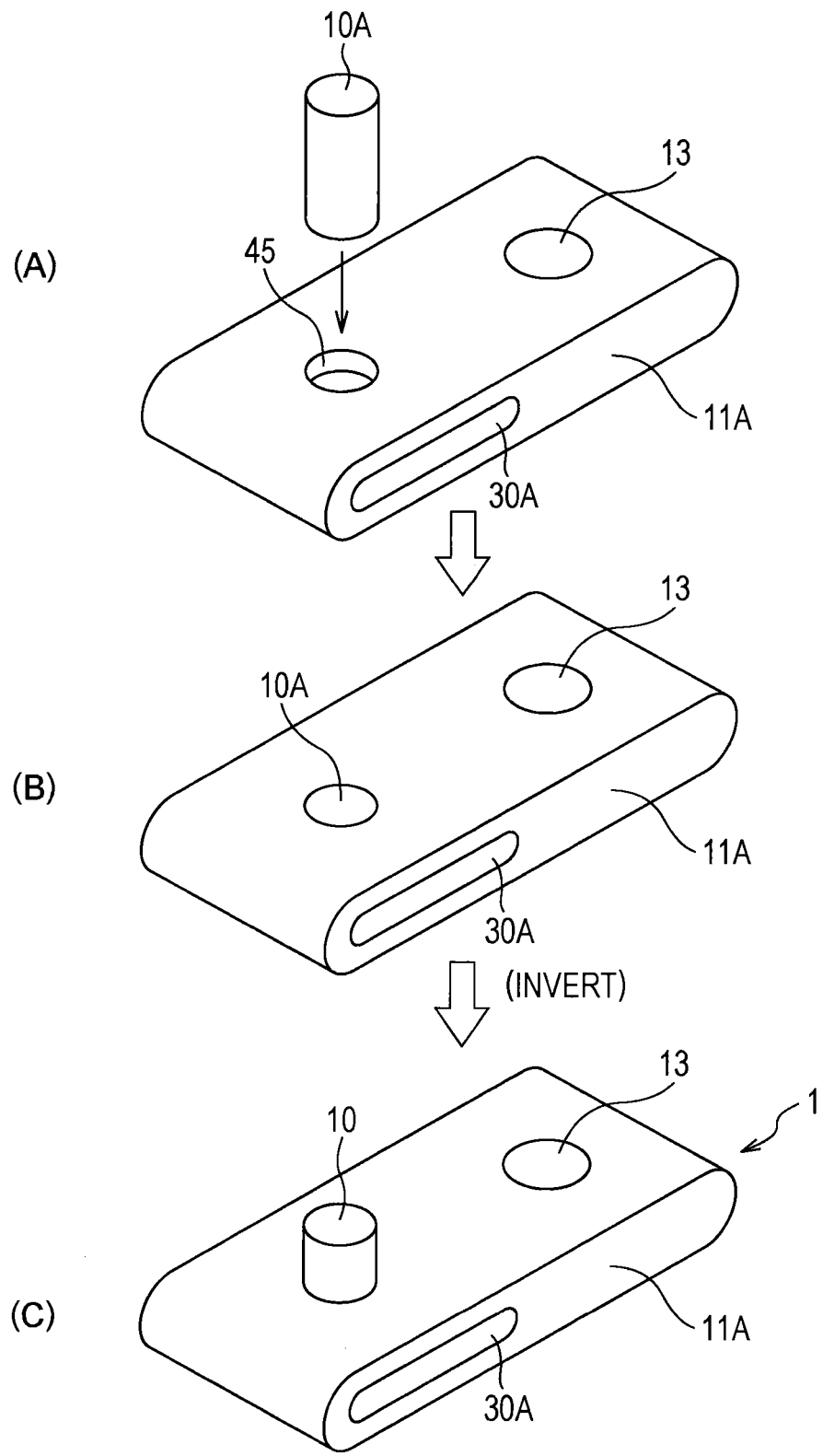
FIGS. 13(A) to 13(C) are perspective views illustrating in order steps of producing an electrically conductive connecting member according to a fifth embodiment.

In the electrically conductive connecting member 1 of FIGS. 13 and 14, the bar-shaped section 10 is in contact with the band-plate-shaped section 11. Since the bar-shaped section 10 is also reliably in contact with the embedded material 30 of the same metal, electrical continuity can be ensured reliably.

It should be considered that the embodiments disclosed here are exemplary in all aspects, but are not restrictive. The scope of the present invention is defined not by the above description, but by the scope of claims, and is intended to include meanings equivalent to the scope of claims and all changes within the scope.

For example, while the electrically conductive connecting member 1 used as the plus output terminal is illustrated in the first to fifth embodiments, it may be adopted as the minus output terminal. In this case, preferably, the bar-shaped section 10 is formed of the same metal (copper or a copper alloy) as that for the negative-electrode carrier of the battery cell 2, and the band-plate-shaped section 11 is formed of the same metal (aluminum or an aluminum alloy) as that for the positive-electrode carrier 5 of the battery cell 2. Needless to say, when the embedded material 30 is adopted, it is formed of the same metal (copper or a copper alloy) as that for the negative-electrode carrier of the battery cell 2, similarly to the bar-shaped section 10.

While the electrically conductive connecting member 1 of the present invention is extremely suitable for connection of a car-mounted lithium ion battery, it can be used for connection of a lithium ion battery (battery) in other use without any problem.

The connecting hole 13 does not always need to be formed in the band-plate-shaped section 11. For example, a projecting bar section to be connected to the output terminal of a polarity different from that of the output terminal connected to the bar-shaped section 10 can be provided integrally with the band-plate-shaped section 11.

The planar shape of the electrically conductive connecting member 1, that is, the planar shape of the band-plate-shaped section 11 is not limited to the rectangular shape. As illustrated in FIGS. 15(*a*) to 15(*c*), various shapes, such as a spoon shape, a paddle shape, and a gourd shape, can be adopted.

While the present application has been described in detail with reference to the specific embodiments, it is obvious to a person skilled in the art that various changes or modifications can be made without departing from the spirit and scope of the invention.

The present application is based on Japanese Patent Application (No. 2010-232448) filed Oct. 15, 2010, and the contents of which is incorporated herein by reference.

INDUSTRIAL APPLICABILITY

According to the present invention, it is possible to realize a high-performance and high-reliability electrically conductive connecting member that is suitable for a battery including a plus output terminal and a minus output terminal formed of different metals, that can suppress electric resistance while preventing electrolytic corrosion, and that is excellent in mechanical strength.

While this electrically conductive connecting member can be used alone for various batteries, it is possible to produce a battery in which the electrically conductive connecting member of the present invention is assembled as one electrode beforehand and to offer the battery including the electrically conductive connecting member to a market.

REFERENCE SIGNS LIST

1: electrically conductive connecting member
1A: billet
1B: molded part
2: battery cell
4: assembled battery
5: positive-electrode carrier
6: minus terminal
10: bar-shaped section
10A: positive-electrode blank
11: band-plate-shaped section
11A: negative-electrode blank
12: raised portion
13: connecting hole
15: internal connecting portion
16: nut
20: extrusion device
21: die
30: embedded material
30A: positive-electrode blank
32: recess
33: raised portion
45: attachment hole

The invention claimed is:

1. An electrically conductive connecting member for power output that is used for a battery including a pair of output terminals formed of different metals, the electrically conductive connecting member comprising:
   an electrode section connected to one of the output terminals and formed of the same metal as that for the one of the output terminals, and a bus bar section connected to the electrode section and formed of the same metal as that for the other output terminal,
   wherein the electrode section and the bus bar section are integrated with each other through diffusion bonding,
   wherein the electrode section is a columnar bar-shaped section,
   wherein the bus bar section is a band-plate-shaped section connected to one end of the bar-shaped section and extending in a direction away from an axial center of the bar-shaped section, and
   wherein an embedded material formed of the same metal as that for the bar-shaped section is embedded in a center portion of the band-plate-shaped section in a plate thickness direction where the bar-shaped section is to be connected.

2. The electrically conductive connecting member according to claim 1,
   wherein one of the bar-shaped section and the band-plate-shaped section is formed of aluminum or an aluminum alloy, and
   wherein the other of the bar-shaped section and the band-plate-shaped section is formed of copper or a copper alloy.

3. A production method for the electrically conductive connecting member according to claim 1, the production method comprising:
   preparing a composite blank including a metal blank that forms the bar-shaped section and a metal blank that surrounds the metal blank for the bar-shaped section and forms the band-plate-shaped section; and
   cutting the band-plate-shaped section to form the bar-shaped section after subjecting the composite blank to extrusion or drawing with a die in a hydrostatic pressure environment.

4. A production method for the electrically conductive connecting method according to claim 1, the production method comprising:
   preparing a composite blank including a metal blank that forms the bar-shaped section and a metal blank that surrounds the metal blank for the bar-shaped section and forms the band-plate-shaped section;
   cutting the band-plate-shaped section to expose a part of the embedded material outside after the composite blank is subjected to extrusion or drawing with a die in a hydrostatic pressure environment; and
   welding the bar-shaped section to the exposed part of the embedded material.

5. A production method for the electrically conductive connecting member according to claim 1, the production method comprising:
   forming an attachment hole in a metal blank that forms the band-plate-shaped section; and
   press-fitting a metal blank that forms the bar-shaped section in the attachment hole so that the metal blank is held protruding from the metal blank that forms the band-plate-shaped section.

6. A battery comprising the electrically conductive connecting member according to claim 1 as one or the other of electrodes.

7. A battery comprising the electrically conductive connecting member produced by the production method according to claim 3 as one or the other of electrodes.

\* \* \* \* \*